United States Patent [19]

Hirota

[11] 4,057,095

[45] Nov. 8, 1977

[54] FLEXIBLE SHEET FIXING DEVICE

[76] Inventor: Yoshinari Hirota, 773-38, Shimokizaki, Oaza, Urawa, Saitama, Japan

[21] Appl. No.: 628,124

[22] Filed: Nov. 3, 1975

[51] Int. Cl.$^2$ .............................................. A44B 21/00
[52] U.S. Cl. ................................ 160/392; 24/243 K; 160/395
[58] Field of Search ............... 24/72.5, 72.7, 261 HC, 24/261 A, 261 B, 261 R, 261 AC, 261 CF, 261 CS, 261 PT, 261 LT, 261 WL, 261 DS, 261 TC, 261 TF, 261 PC, 243 P, 243 K, 243 R, 243 M, 243 N, 73 AS, 73 BC, 73 CH, 73 CM, 201 C; 52/63, 222; 47/17, 29; 160/382, 383, 386, 391, 392, 394, 395, 397, 396, 399, 371

[56] References Cited

U.S. PATENT DOCUMENTS

| 783,759 | 2/1905 | Record | 160/392 |
|---|---|---|---|
| 1,240,944 | 9/1917 | Clay | 24/261 R |
| 1,698,064 | 1/1929 | Otto | 160/371 |
| 1,779,859 | 10/1930 | Shrauger | 160/397 |
| 2,042,726 | 6/1936 | Mueller | 160/394 |
| 2,647,984 | 8/1953 | Falge | 24/261 CS |
| 2,802,551 | 8/1957 | Roberts | 52/222 |
| 2,834,412 | 5/1958 | Velke | 160/395 |
| 3,103,083 | 9/1963 | Seeger | 52/63 |
| 3,757,479 | 9/1973 | Martinez | 52/222 |

FOREIGN PATENT DOCUMENTS

| 910,194 | 11/1962 | United Kingdom | 52/222 |
|---|---|---|---|
| 12,206 | 11/1913 | United Kingdom | 24/725 |

Primary Examiner—Paul R. Gilliam
Assistant Examiner—Kenneth J. Dorner
Attorney, Agent, or Firm—McGlew and Tuttle

[57] ABSTRACT

A device for fastening sheet material, such as plastic sheeting, to a framework, such as a greenhouse construction, composes longitudinally extending channel members firmly attached to the framework at selected parallel locations, the channel members having opposing, outwardly projecting longitudinal flange portions which converge slightly towards each other to define a dove-tail cross-section groove. The entire network of channels is overlaid with the sheet material and the sheet material is depressed into the channels and held therein by a resilient retaining member, such as a zig-zag spring member which is operatively inserted into the channel and held therein by the converging flange portions, thereby positively connecting the sheet material to the channels and the framework. The sheet material is easily removed from the channel members and different thicknesses of sheet can be accommodated.

3 Claims, 5 Drawing Figures

FLEXIBLE SHEET FIXING DEVICE

FIELD AND BACKGROUND OF THE INVENTION

This invention relates to the fixing equipment or devices for flexible sheet. For example, in using the invention devices for attaching sheets on the frame of a plastic greenhouse, the securing of, the plastic films on the frame is made much easier and can be effected in one securing action. Furthermore, the devices can be used for cottage windows to fix both plastic films and mosquito nets, in a quick way and at low cost.

Generally, in a plastic greenhouse, or any type of a pipe house, large steel frame house or connected house, it is usual to stretch transparent plastic sheets over the roof and sides so that solar heat may be absorbed into the house through the plastic sheets.

However, the work of stretching the above mentioned plastic sheets on the roof framework or side framework of a greenhouse is very difficult. In fact, in fixing the sheets by using wires, pressing straps and nails, a great deal of labor and time are required and th working efficiency is very low. Furthermore, as the duration of plastic sheets is for two years at the most, such stretching work must be repeated every two years. In addition to the above mentioned fastening elements, many tools are required to use these elements. Consequently, it is expensive to stretch and secure plastic sheets over the framework of a greenhouse, for example.

A first object of the present invention is to obviate the above-mentioned problems so that users may easily stretch and fix plastic sheets on the framework of houses.

A second object of the present invention is not only easily to stretch and fix plastic sheets but also to very stably stretch and tension the sheets so that they will not loosen.

A third object of the present invention is to prevent stretched and fixed sheets from breaking.

A fourth object of the present invention is to prevent even rather hard sheets, fixed to a skeleton framework, from wrinkling.

A fifth object of the present invention is to provide devices for fixing sheets over a framework with few tools.

Another object of the present invention is to make the sheets perform the function of reinforcements for a skeleton framework.

A further object of the present invention is to provide devices for stretching and fixing mosquito nets and screen door frames and for stretching metal screens.

For an understanding of the present invention, reference is made to the following description of typical embodiments thereof as illustrated in the accompanying drawings.

DETAILED EXPLANATION OF THIS INVENTION

Figure 1:
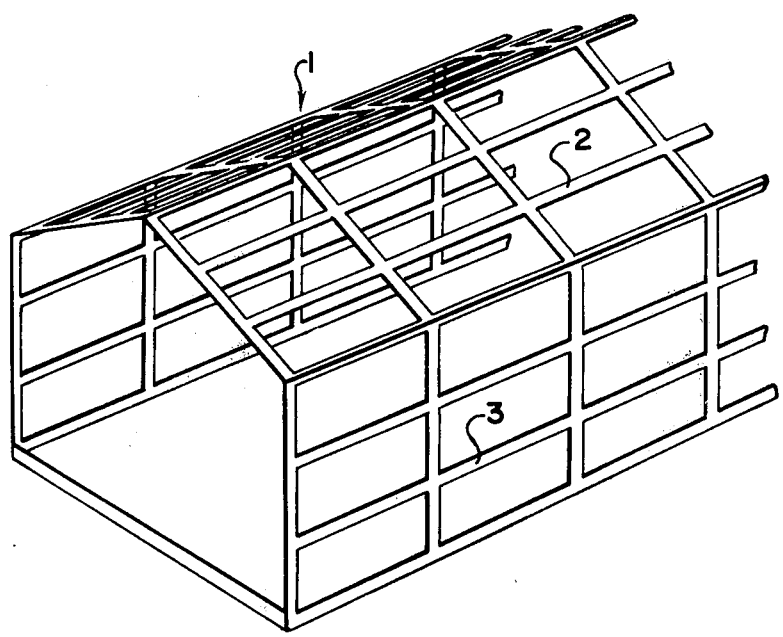
FIG. 1 is a perspective view of the skeleton frame structure of a greenhouse.
Figure 2:
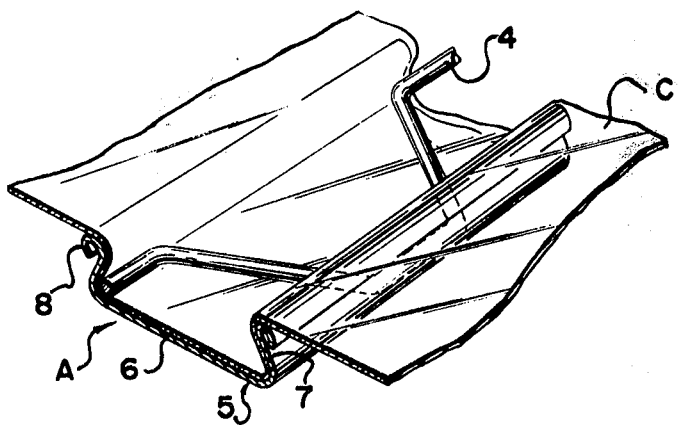
FIG. 2 is a sectioned perspective view of one embodiment of, the fixing device with plastic film.
Figure 4:
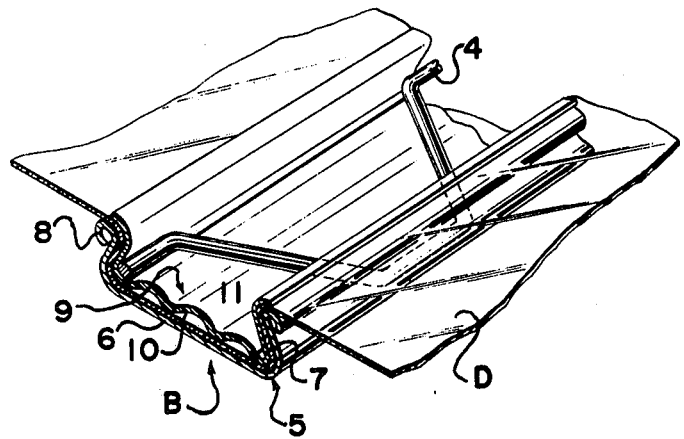
FIG. 4 is a view similar to FIG. 2 illustrating fixing of rather harder plastic film.

Fixing devices A and B of the present invention, shown respectively in FIGS. 2 and 4, are designed to stretch transparent plastic sheets or films over the skeleton structure or framework 1 of a plastic greenhouse, such as shown in FIG. 1. The skeleton structure or framework 1 includes a skeleton roof structure 2 and a skeleton side structure 3.

Referring first to the fixing device A, this includes an elongated metal channel member 5 and a special corrugated zig-zag spring or resilient member 4, which is angularly undulated. The channel 5 has a substantially flat base 6 and flanges 7 which converge upwardly toward each other and terminate in curled or reentrant upper edges 8. The cross-section of the channel 5 thus has a dovetail shape. The base 6 is formed with holes spaced therealong for the purpose of receiving bolts 13 which, in cooperation with nuts 14, are used to initially secure each channel 5 to the skeleton roof framing 2 and the skeleton wall framing 3, although the channels 5 could be secured to the skeleton framing by other means such as welding or other suitable metal fixtures. The channels 5, thus secured to the skeleton framing, extend longitudinally thereof in spaced parallel relation to each other. To form the "skin" or covering of the skeleton frame, a plastic sheet C is stretched over the skeleton structure 1 and into the interior of the channels 5, wherein the stretched plastic sheet C is fixed by insertion of the corrugated or angularly undulating zig-zag resilient element or spring 4 which, due to its resilience, forces the plastic sheet into conforming engagement with the interior of each channel 5, the spring 4 holding the sheet against the base 6 of channel 5 and seating in the junction between the base 6 and the flanges 7 of each channel 5.

The device A, thus used to stretch and fix the soft plastic sheet C over the skeleton framework 1, is thus constituted by the elongated channel member 5, having a dovetail interior cross-section throughout its entire length, and the resilient member 4, such as a zig-zag spring. The plastic sheet C is firmly engaged in the dovetail interior of the channel 5 by means of the zig-zag spring 4 so as to be pressed into such interior and fixed therein by the resiliency of the spring 4. The curled reentrant outer edges 8 of the flanges 7 protect the plastic sheet C, thus preventing it from breaking.

The channel 5 is to be used like a straight rail when it is to be fixed along a skeleton frame.

If the channels 5 are to be used on a dome-shaped frame, they can easily be bent to the proper curvature and fixed along the skeleton dome-shaped frame and, if a channel has to be used at the corner of a skeleton frame, it can be suitably bent around the corner.

Zig-zag spring 4, for insertion in channel 5 to fix the plastic sheet C in the dovetail interior of the channel 5, can be replaced with any other resilient means having the same effect, although the zig-zag spring 5 has proven most effective in practice. Plastic sheet C can be easily removed in one operation by extracting the zig-zag spring 4 out of the dove-tail groove defined by the elongated channe member 5.

Figure 5:
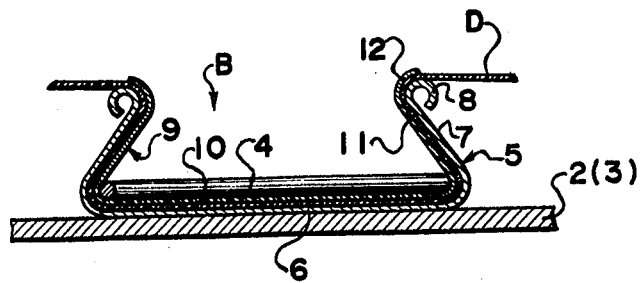
FIG. 5 is a sectional view of FIG. 4.

In using rather hard plastic film or sheet, due to the strong tension near the curled edges 8 of flanges 7, sometimes little creases will appear because of less flexibility of the harder film. The creases may cause serious damage to the film, and moreover is not desirable for the sake of appearance. Therefore, when fixing the harder plastic film, it is advisable to use the device (B) (see FIG. 4, FIG. 5). The device (B) is the same as the equipment A, insofar as it includes a channel 5 and a zig-zag spring 4. However, device B additionally includes a pressing plate 9. The base 10 of pressing plate 9 is corrugated and is made of plastic, rubber, or cloth so as to be easily bent and extended. Both flanges 11 of pressing plate 9 are formed of a hard material integral with or connected to the base 10, and these flanges 11 extend toward each other at the same angle to base 9 as do the flanges 7 of the channel 5 with respect to the base 6 of the channel, so as again to define, in cross-section, a dovetail shape. The upper edges 12 of the flanges 11 of pressing plate 9 are curved to conform to the curvature of the curled upper edges 8 of the flanges of the channel member 5.

Figure 3:
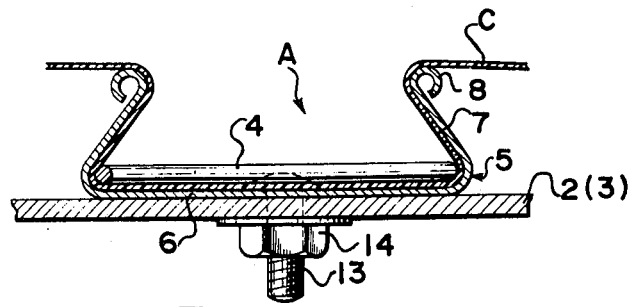
FIG. 3 is a cross-sectional view showing the fixing device of FIG. 2 as fixed to the skeleton frame structure of the greenhouse.

In using the fixing device B, the latter is secured to a skeleton framework in the same manner as the fastening device A shown in FIGS. 1, 2 and 3, by means of bolts 13 and nuts 14 or by any other fixing procedure or means. Plastic sheet D is pressed into the dovetail grooves of the channels 5 by the pressing plates 9, and then zig-zag springs 4 are pushed in to the pressing plates 9. The pressing plate 9 is so flexible, transversely of its base 10, as to be rather easily partially collapsed so as to be able to be easily inserted into the dovetail groove of the channel 5. When zig-zag spring 4 is then pushed into pressing plate 9, both flanges of the pressing plate will press outwardly so that plastic sheet D is sandwiched between the exterior of the pressing plate 9 and the interior of the associated channel member 5, and thus the plastic sheet D is fixed in the dovetail groove of each channel member 5. Furthermore, the portions of the plastic sheet D engaging the curled edges 8 at the upper edges of flanges 7 of channel 5 are pressed, by the conformingly curved upper end parts 12 of pressing plate 9, so that there is substantially no wrinkle in the rather hard plastic sheet D. Thus, there is no factor blocking the rather hard plastic sheet D from having a satisfactory appearance when it is anchored in the fastening devices B.

Plastic sheets D can be easily removed in a single operation by extracting the zig-zag springs 4 out of the pressing plates 9 and removing the pressing plates 9 out of the dovetail grooves of the channel members 5.

From the foregoing description, it will be clear that, with the fixing devices of the present invention, plastic sheets can be easily stretched and fixed over a skeleton framework, and likewise can be easily removed therefrom. Additionally, the plastic sheets are held in the dovetail grooves of the elongated channels 5, are uniformly pressed in the lengthwise direction, and thus can be stably stretched and fixed, in addition to which the plastic sheets are tensioned and thus are not loosened by wind pressure or broken. Even rather hard plastic sheets can be stretched and fixed without being wrinkled.

With the fixing devices of the present invention, and by varying the fitting positions on the skeleton framework of a greenhouse or the like, the plastic sheets can be fixed not only on the rising side but also at the vertical ends of the structure. Additionally, the fixing devices of the present invention have few parts, are simple in structure and require few tools to stretch the sheet. Consequently, the sheet stretching and fixing work is greatly reduced, the working efficiency is increased, and the cost is reduced. By fitting the fixing devices of the present invention to the skeleton framework of a greenhouse or the like, the skeleton frame can be reinforced by the channel members having the dovetail grooves, and thus the skeleton structure of a greenhouse or the like can be made economical and durable.

Finally, with the fixing devices of the present invention, not only plastic sheets but also such flexible sheets as cloth, rubber and screen sheets can all be stretched and fixed. Thus, the fastening devices of the present invention can be used not only for greenhouse stretchers but also for windowframes and doorframes, so that it has a wide range of use.

While specific embodiments of the invention have been shown and described in detail to illustrate the application of the principles of the invention, it will be understood that the invention may be embodied otherwise without departing from such principles.

I claim:

1. A device for stretching and fixing flexible sheets over a skeleton framework to enclose the framework, said device comprising, in combination, an elongated channel having a substantially flat base and outwardly extending flanges converging toward each other to define, with said base, an outwardly opening groove which has a dovetail shape in cross-section; said base being arranged to be secured to a skeleton framework so that plural such channels can be secured to the framework to extend longitudinally thereof in spaced parallel relation to each other; an elongated, undulating zig-zag spring resiliently engageable in said dovetail groove adjacent said base; and a pressing plate in the form of an elongated channel member having a base and flanges extending outwardly from said base, said elongated channel member being sufficiently flexible laterally for pressing of the same into the dovetail groove of said channel with the flanges of said channel member resiliently pressing outwardly against the flanges of said channel; whereby, after a flexible sheet has been stretched transversely over said channel and into the dovetail grooves thereof, a respective pressing plate may be pressed into the dovetail groove of each channel so that the sheet is retained between the interior surfaces of the channel and the exterior surfaces of the pressing plate, and a respective said zig-zag spring may be inserted into each pressing plate to firmly compress the flexible sheet between the exterior surfaces of the pressing plate and the interior surfaces of the channel.

2. A device as claimed in claim 1, wherein the outer edges of said flanges are reentrantly curled to form a smooth surface for engagement with the flexible sheet, and wherein the outer edges of said channel are reentrantly curled to form a smooth surface for engagement with the flexible sheet; the outer edges of the flanges of said channel-shape pressing plate having a curvature conforming to the curvature of the reentrantly curled outer edges of said channel.

3. A device, as claimed in claim 2, wherein the base of the channel member constituting said pressing plate is longitudinally corrugated so as to be laterally flexible and the flanges of said channel member are formed of a relatively hard, rigid material.

* * * * *